(12) United States Patent
Katsumata

(10) Patent No.: US 8,731,049 B2
(45) Date of Patent: May 20, 2014

(54) IMAGE DATA TRANSMITTING APPARATUS, IMAGE DATA RECEIVING APPARATUS, IMAGE DATA TRANSMISSION SYSTEM, IMAGE DATA TRANSMITTING METHOD, AND IMAGE DATA RECEIVING METHOD

(75) Inventor: Noboru Katsumata, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 370 days.

(21) Appl. No.: 13/103,510

(22) Filed: May 9, 2011

(65) Prior Publication Data
US 2012/0051419 A1 Mar. 1, 2012

(30) Foreign Application Priority Data
Aug. 30, 2010 (JP) ................................ 2010-192767

(51) Int. Cl.
*H04N 7/12* (2006.01)
*H04N 7/50* (2006.01)
*H04N 21/8547* (2011.01)
*H04N 9/804* (2006.01)
*H04N 21/00* (2011.01)
*H04N 7/26* (2006.01)
*H04N 5/85* (2006.01)

(52) U.S. Cl.
CPC .............. *H04N 7/50* (2013.01); *H04N 21/8547* (2013.01); *H04N 9/8042* (2013.01); *H04N 21/00* (2013.01); *H04N 7/26244* (2013.01); *H04N 7/26271* (2013.01); *H04N 7/26372* (2013.01); *H04N 5/85* (2013.01)
USPC .................................. 375/240.01; 375/240.02

(58) Field of Classification Search
CPC ........... H04N 7/50; H04N 21/00; H04N 5/85; H04N 7/26372; H04N 7/2627; H04N 9/8042; H04N 21/8547

USPC ....................................................... 375/240.01
See application file for complete search history.

(56) References Cited

U.S. PATENT DOCUMENTS

| 5,751,339 | A | * | 5/1998 | Aramaki et al. ............ 348/14.13 |
| 5,821,889 | A | * | 10/1998 | Miller ............................ 341/139 |
| 5,831,679 | A | * | 11/1998 | Montgomery et al. ....... 348/473 |

(Continued)

FOREIGN PATENT DOCUMENTS

| EP | 0368528 A2 | * | 5/1990 | ................ H03G 3/34 |
| JP | 2001007775 A | * | 1/2001 | ................ H04J 3/00 |
| JP | 2009-141502 | | 6/2009 | |
| JP | 2009141502 A | * | 6/2009 | ................ H04N 7/26 |

OTHER PUBLICATIONS

JP2009141502MT, Machine translation of the Japanese document JP2009141502A downloaed from JPO Web sites, 2009.*

*Primary Examiner* — Andy Rao
*Assistant Examiner* — Shan Elahi
(74) *Attorney, Agent, or Firm* — Venable LLP; Michael A. Sartori

(57) ABSTRACT

A compression unit compresses image data. An marker insertion unit inserts a synchronization marker for each of the image data compressed by the image compression unit. A transmitter transmits the image data into which the synchronous marker has been inserted, using a transmission method of digital audio signals. A bit sequence constituting the synchronization marker is so set as to become a value different from a bit sequence, converging to zero, which is generated by the transmitter or a receiver for receiving the image data transmitted from the transmitter when a mute function is activated in the transmitter or the receiver.

11 Claims, 8 Drawing Sheets

(56) References Cited

U.S. PATENT DOCUMENTS

| | | | |
|---|---|---|---|
| 6,173,006 B1* | 1/2001 | Kent et al. ............... 375/145 |
| 6,418,159 B1* | 7/2002 | Umemoto ............... 375/219 |
| 6,681,195 B1* | 1/2004 | Poland et al. ............ 702/142 |
| 6,907,067 B1* | 6/2005 | Moeller et al. ......... 375/240.01 |
| 8,416,945 B2* | 4/2013 | Doss et al. ............ 379/388.05 |
| 2002/0131511 A1* | 9/2002 | Zenoni ............... 375/240.28 |
| 2003/0035064 A1* | 2/2003 | Torikoshi et al. .......... 348/515 |
| 2004/0045036 A1* | 3/2004 | Terasaki ............... 725/116 |
| 2004/0107407 A1* | 6/2004 | Henson et al. ............ 716/1 |
| 2004/0217948 A1* | 11/2004 | Kawasaki et al. .......... 345/204 |
| 2006/0104369 A1* | 5/2006 | Kikuchi et al. ......... 375/240.28 |
| 2006/0114944 A1* | 6/2006 | Kim et al. ............... 370/516 |
| 2007/0006269 A1* | 1/2007 | Huang et al. ............ 725/81 |
| 2007/0076787 A1* | 4/2007 | Miller et al. ............ 375/149 |
| 2007/0174880 A1* | 7/2007 | Fite et al. ............... 725/87 |
| 2008/0084165 A1* | 4/2008 | Otsuka et al. ............ 315/82 |
| 2010/0118957 A1* | 5/2010 | Demos ............... 375/240.15 |
| 2011/0002399 A1* | 1/2011 | Raveendran ......... 375/240.28 |

* cited by examiner

FIG.3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| 1  | 1  | 1  | 1  | 1  | 1  | 1  | 1  | 1  | 1  | 1  | 1  | 1  | 1  | 1  | 1  | 1  | 1  | 1  | 1  | 1  | 1  | 1 | 1 | x | x | x | x | x | x | x | x |

301

310 — bits 8–31

320 — bits 0–7

FIG. 4

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 1 | x | x | x | x | x | x | x | x | x | x | x | x | x |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 0 | x | x | x | x | x | x | x | x | x | x | x | x | x | x |

410b    401b    420b

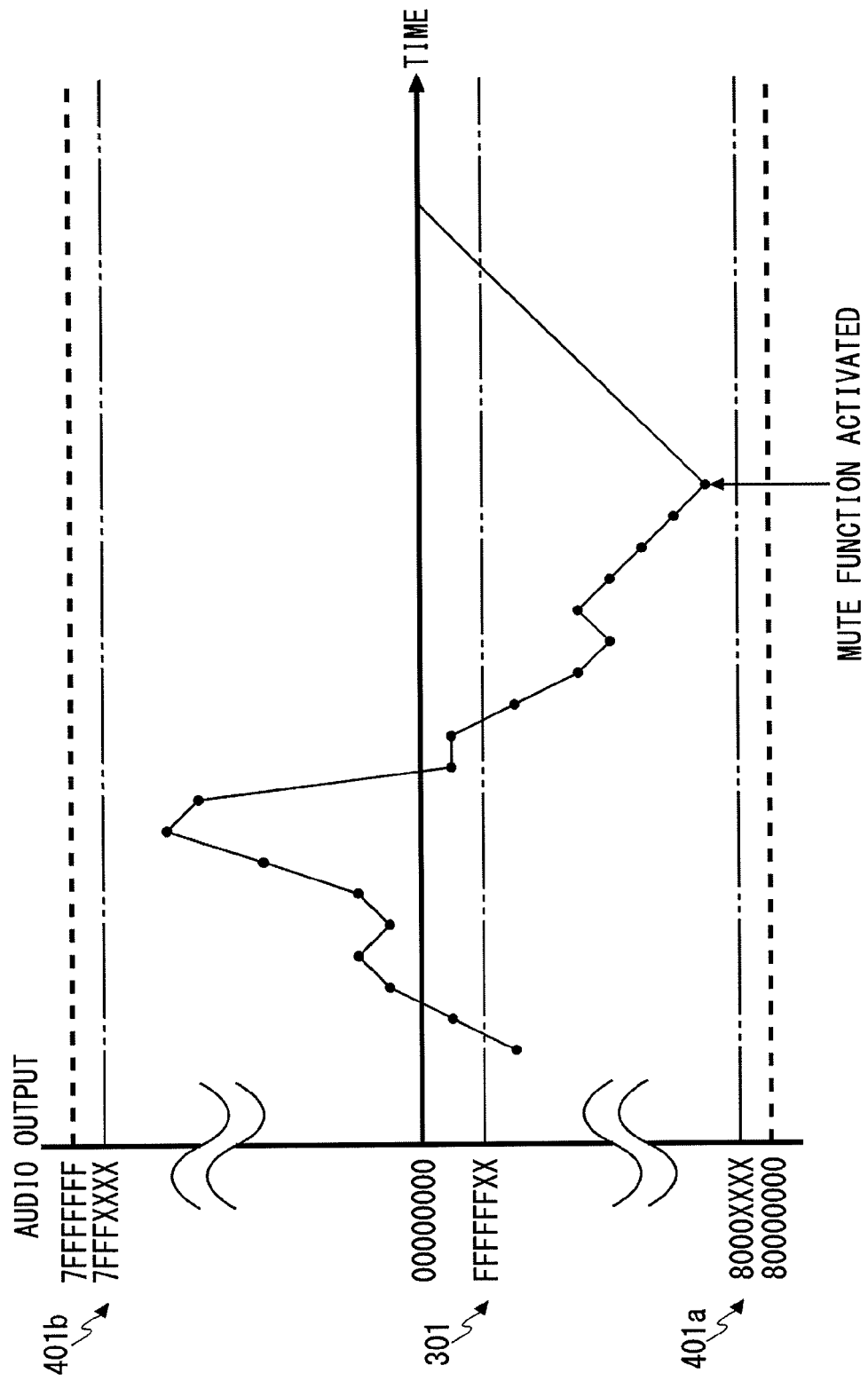

IMAGE DATA TRANSMITTING APPARATUS, IMAGE DATA RECEIVING APPARATUS, IMAGE DATA TRANSMISSION SYSTEM, IMAGE DATA TRANSMITTING METHOD, AND IMAGE DATA RECEIVING METHOD

BACKGROUND OF THE INVENTION

1. Field of the Invention

The present invention relates to an image data transmitting apparatus, image data receiving apparatus, an image data transmission system, an image data transmitting method, and an image data receiving method using a transmission method for digital audio signals.

2. Description of the Related Art

Proposed in recent years is a method where image data is wirelessly transmitted using an LSI used to transfer audio signals (See Reference (1) in the following Related Art List, for instance). This method is advantageous in that the image data can be transferred in real time with reduced delay and it is easy to achieve lip synchronization between a transmitting side and a receiving side. Also, the method is advantageous in that the protocols can be simplified and therefore the start can be made faster. This transmission method is suitable for application, which requires severe real-timeliness but does not need the transmission of audio data, such as the transmission of images between an on-vehicle camera and an on-vehicle monitor.

RELATED ART LIST (1) Japanese Unexamined Patent Publication No 2009-141502.

In the transmission of image data, it is generally practiced that a synchronization marker is inserted frame by frame in order to achieve synchronization between the transmitting side and the receiving side.

In most cases, the LSI used to transfer audio signals (hereinafter referred to as "audio signal transfer LSI" also) is equipped with a mute function. The mute function is a function activated when cross talk or the like occurs. In the mute function, the signal during transmission is gradually attenuated and is made to converge to zero in order that the crosstalk signals should not reach the receiving side. For example, if, in the example of the above-described on-vehicle camera, wireless LAN or Bluetooth is used in a vehicle or if vehicles using the same system having close channels approach each other, the cross talk will possibly occur.

When the mute function is activated, it is possible that a bit sequence identical to the aforementioned synchronization marker is generated while the signals in the transmission converges to zero. In such a case, a problem arises where erroneous information is conveyed to the receiving side and is thereby possibly led to malfunction at the receiving side.

SUMMARY OF THE INVENTION

The present invention has been made in view of the foregoing circumstances, and a purpose thereof is to provide a technology for suppressing malfunction at the receiving side even though the mute function of audio transferring the LSI is activated when image data are transmitted using the audio transferring the LSI.

An image data transmitting apparatus according to one embodiment of the present invention includes: an image compression unit configured to compress image data; a marker insertion unit configured to insert a synchronization marker for each of the image data compressed by the image compression unit; and a transmitter configured to transmit the image data into which the synchronization marker has been inserted, using a transmission method for digital audio signals. A bit sequence constituting the synchronization marker is so set as to become a value different from a bit sequence, converging to zero, which is generated by the transmitter or a receiver for receiving the image data transmitted from the transmitter when a mute function is activated in the transmitter or the receiver.

Another embodiment of the present invention relates to an image data receiving apparatus. This apparatus includes: a receiver configured to receive compressed image data into which a synchronization marker has been inserted, using a transmission method for digital audio signals; a marker extraction unit configured to extract the synchronization marker from the image data received by the receiver; and an image expansion unit configured to expand compressed image data from which the synchronization marker has been removed by the maker extraction unit, based on the synchronization marker. A bit sequence constituting the synchronization marker is so set as to become a value different from a bit sequence, converging to zero, which is generated by the receiver or a transmitter for transmitting the image data to the receiver when a mute function is activated in the receiver or the transmitter.

Still another embodiment of the present invention relates to an image data transmission system. This system includes: the above-described image data transmitting apparatus; and the above-described image data receiving apparatus for receiving the image data transmitted from the image data transmitting apparatus.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 3 shows an exemplary bit structure of a vertical synchronization marker according to an comparative example;

FIG. 4 shows an exemplary bit structure of a first vertical synchronization marker according to an embodiment of the present invention;

FIG. 5 shows an exemplary bit structure of a second vertical synchronization marker according to an embodiment of the present invention;

FIG. 6 shows an example of values outputted from an audio transfer LSI used for a transmitter or a receiver according to an embodiment of the present invention;

FIGS. 7A and 7B each explains a process by which to allow compressed-and-coded imaged data and a vertical synchronization marker to be identified therebetween.

DETAILED DESCRIPTION OF THE INVENTION

The invention will now be described by reference to the preferred embodiments. This does not intend to limit the scope of the present invention, but to exemplify the invention.

Figure 1:
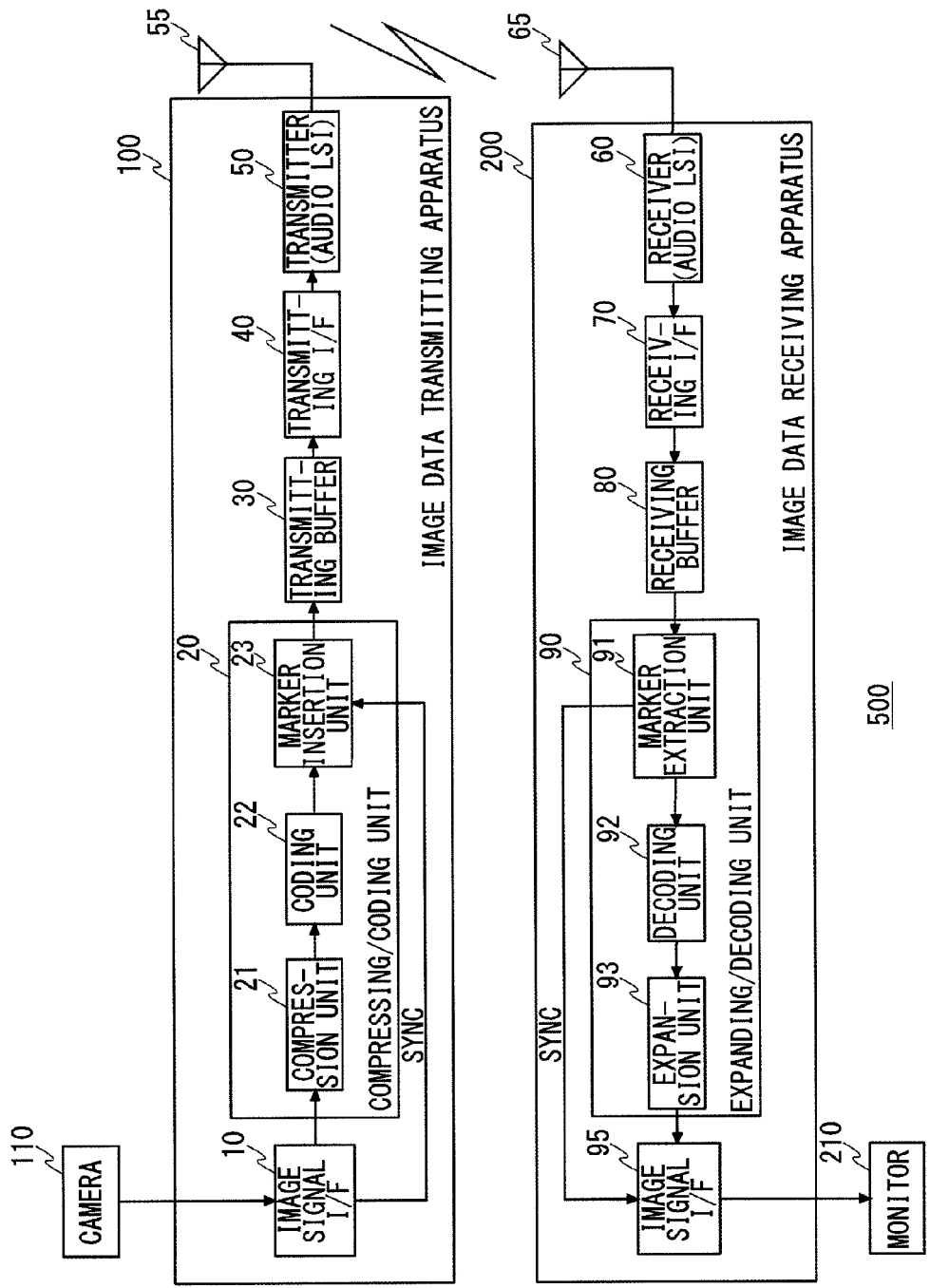
FIG. 1 shows a structure of an image data transmission system according to an embodiment of the present invention.

FIG. 1 shows a structure of an image data transmission system 500 according to an embodiment of the present invention. The image data transmission system 500 includes a camera 110, an image data transmitting apparatus 100, a transmitting antenna 55, a receiving antenna 65, an image data receiving apparatus 200, and a monitor 210. A description is hereunder given of the image data transmission system 500 which is assumed to be an on-vehicle camera system wherein the image data acquired by the camera 110 installed in a rear part of a vehicle is transmitted to the monitor 210 installed in the vehicle and then displayed thereon.

The image data transmitting apparatus 100 includes an image signal interface (I/F) 10, a compressing/coding unit 20, a transmitting buffer 30, a transmitting interface (I/F) 40, and a transmitter 50. The compressing/coding unit 20 includes a compression unit 21, a coding unit 22, and a marker insertion unit 23.

The camera 110, which is comprised of solid-state image sensing devices such as CCD (Charge-Coupled Device) image sensors or CMOS (Complementary Metal-Oxide Semiconductor) image sensors, outputs the picked-up image data to the image signal I/F 10. For example, the image data is outputted from the camera 110 to the image signal I/F 10 by complying with the ITU-R BT.656 standard. Also, a synchronization signal SYN retrieved from the image data is supplied to the marker insertion unit 23.

The compressing/coding unit 20 compresses and codes the image data inputted from the image signal I/F 10. Further, a vertical synchronization marker is appended to the image data which has been compressed and coded. A more specific description thereof is given hereunder. The compression unit 20 compresses the image data inputted from the image signal I/F 10. For example, the image data is subjected to orthogonal transform and quantization, thereby compressing the amount of data.

The coding unit 22 codes the image data which has been compressed by the compression unit 21. For example, the compressed image data is entropy-coded. Since the real-timeliness is required in the present embodiment, it is preferred that a JPEG-based method for compressing and coding the image data be used. The image data is compressed and coded using Motion JPEG, for instance.

Based on the synchronization signal SYNC supplied from the image signal I/F 10, the marker insertion unit 23 inserts the vertical synchronization marker in units of frame of the compressed and coded image data. As a result, the synchronization signal can be transmitted to the receiving side. A detailed description of the vertical synchronization marker will be given later.

Also, the marker insertion unit 23 delimits the compressed and coded data by n byte long (n being a natural number). In the present embodiment, the compressed and coded data is delimited by 32 bit (4 byte) long. Delimiting the data by 32 bits is such that the delimited portions are aggregated in the order of time series starting from the most significant bit (MSB). The image data, compressed and coded in units of 32 bits, into which the vertical synchronization marker has been inserted, is written to the transmitting buffer 30 and is stored temporarily therein. The image data stored in the transmitting buffer 30 is read out by the transmitting I/F 40 with predetermined data transfer timing.

The transmitter 50 transmits, through wireless or wired connections, the image data into which the vertical synchronization marker has been inserted, using a transmission method for digital audio signals. A radio audio transmitter using a 2.4 GHz band is used in the present embodiment. This radio audio transmitter is provided with an audio signal transfer LSI, which is used to transfer digital audio signals. It is appreciated that the audio signal transfer LSI can also transmit the audio signals to a system such as a wireless speaker, with the minimum delay.

The image data receiving apparatus 200 includes a receiver 60, a receiving interface (I/F) 70, a receiving buffer 80, an expanding/decoding unit 90, and an image signal interface (I/F) 95. The expanding/decoding unit 90 includes a marker extraction unit 91, a decoding unit 92, and an expansion unit 93.

The receiver 60 receives, through wireless or wired connections, the compressed and coded image data into which the vertical synchronization marker has been inserted, using the transmission method for digital audio signals. A radio audio receiver that pairs with the aforementioned radio audio transmitter is used in the present embodiment. This radio audio receiver receives the image data transferred from the aforementioned radio audio transmitter. The image data received thereby is written to the receiving buffer 80 via the receiving I/F 70 and is stored temporarily therein. The image data stored in the receiving buffer 80 is read out by the expanding/decoding unit 90.

The expanding/decoding unit 90 removes the vertical synchronization marker from the image data inputted from the receiving buffer 80, and expands and decodes the image data from which the vertical synchronization marker has been removed. A more specific description thereof is now given. The marker extraction unit 91 detects the vertical synchronization marker from the image data read out from the receiving buffer 80 and then extracts the thus detected vertical synchronization marker. The marker extraction unit 91 generates the synchronization signal SYNC based on the thus extracted vertical synchronization marker so as to supply the synchronization signal SYNC to the image signal I/F 95. In this manner, the vertical synchronization marker detected by the marker extraction unit 91 is used to adjust the synchronization between the camera 110 at the transmitting side and the monitor 210 at the receiving side.

A bit sequence of the compressed and coded image data from which the vertical synchronization marker has been separated by the marker extraction unit 91 is sequentially inputted to the decoding unit 92 from an MSB side. The decoding unit 92 decodes this bit sequence in units of 32 bits. The expansion unit 93 expands the decoded image data and outputs it to the image signal I/F 95. The image signal I/F 95 outputs the image signals inputted from the expansion unit 93, to the monitor 210 according to the synchronization signal SYNC supplied from the marker extraction unit 91. The monitor 210 displays the image signals inputted from the image signal I/F 95.

Figure 2:
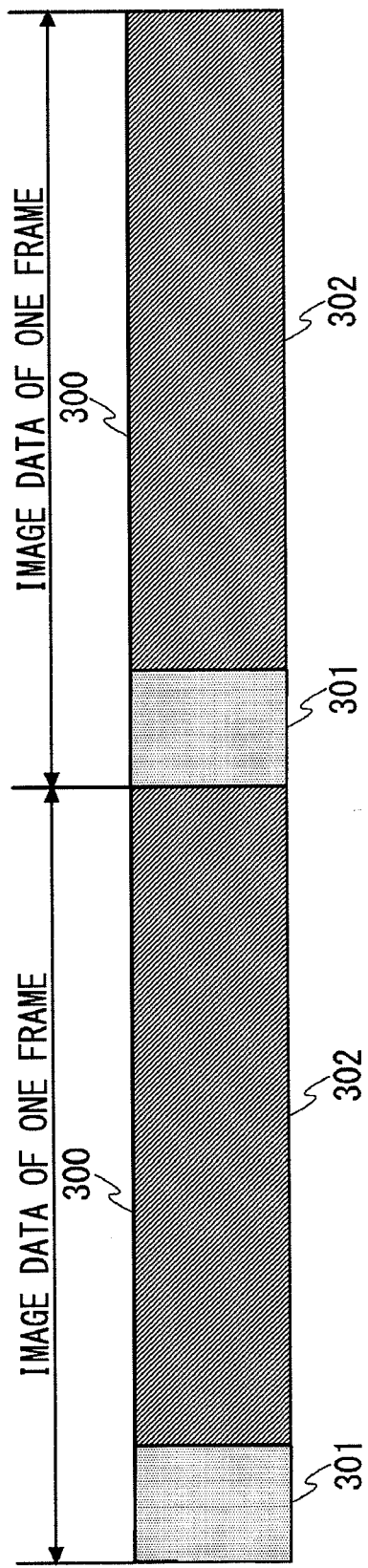
FIG. 2 shows an exemplary structure of an image data stream transmitted from a transmitter to a receiver.

FIG. 2 shows an exemplary structure of an image data stream transmitted from the transmitter 50 to the receiver 60. An image data stream 300 representing one frame is constituted by a vertical synchronization marker 301 and compressed-and-coded image data 302. The receiving side can identify a header of each frame 300 by detecting the vertical synchronization marker 301. A more detailed description is hereinafter given of the vertical synchronization marker 301.

FIG. 3 shows an exemplary bit structure of the vertical synchronization marker 301 according to an comparative example. The vertical synchronization marker 301 according to the comparative example, which is 32 bit long, is constituted by a fixed value area 310 and an auxiliary information area 320. An index indicative of the position of vertical synchronization in an image data stream is inserted into the fixed value area 310. In the comparative example, the fixed value area 310 is constituted by 24 bits. Auxiliary information, such as information on the compression and expansion of image data and offset information on a quantization table, is inserted into the auxiliary information area 320. In the comparative example, the auxiliary information area 320 is constituted by 8 bits.

(FFFFFFXX)$_{16}$ is used for the vertical synchronization marker 301 of the comparative example. "XX" indicates a value of the auxiliary information area 320. As described above, when audio transfer is interrupted due to cross talk or the like, the mute function is activated and therefore the output value of the audio transfer LSI used for the transmitter 50 and the receiver 60 is gradually attenuated to zero. (FFFFFFXX)$_{16}$ used for the vertical synchronization marker 301 of the comparative example is a value close to zero in terms of audio data. Thus, this means that the probability of the occurrence of (FFFFFFXX)$_{16}$ used for the vertical synchronization marker 301 of the comparative example is high when the output value of the audio transfer LSI is attenuated to zero as a result of the activation of the mute function by the audio transfer LSI.

The same data as the vertical synchronization marker 301 occurring at the time of a mute function (hereinafter referred to as "pseudo vertical synchronization marker" as appropriate) may possibly be falsely recognized by the image data receiving apparatus 200 as the proper vertical synchronization marker, in which case a malfunction may be triggered. In what is to follow, a vertical synchronization marker where the pseudo vertical synchronization marker is less likely to occur is considered and examined.

In other words, the bit sequence constituting the vertical synchronization marker is so set as to become a value different from the bit sequence, converging to zero, which is generated by the transmitter 50 or the receiver 60 when the mute function is activated in the transmitter 50 or the receiver 60. Preferably, the bit sequence constituting the vertical synchronization marker is set to a value as far away as possible from zero wherein the value is as close as practicable to an upper limit or lower limit of the range of the digital audio signals generated by the transmitter 50 or the receiver 60. As the value is set closer to the upper limit or lower limit, the probability can be made smaller. Here, the probability means that the bit sequence constituting the digital audio signals and the bit sequence constituting the vertical synchronization marker intersect with each other in a process where the value of the digital audio signals after the activation of the mute function converges to zero (See FIG. 6). More preferably, the bit sequence constituting the vertical synchronization marker is set to a bit sequence which is set beforehand within an allowable range from the upper limit of the range of the digital audio signals generated by the transmitter 50 or the receiver 60 toward the lower limit thereof or set beforehand within an allowable range from the lower limit thereof toward the upper limit thereof. In this case, the allowable range set beforehand from the upper limit thereof toward the lower limit thereof includes the upper limit itself. Note that the allowable range may be set based on statistical data obtained through experiments or simulation runs carried out by a designer. Similarly, the allowable range set beforehand from the lower limit thereof toward the upper limit thereof includes the lower limit itself, and the allowable range may be set based on statistical data obtained through experiments or simulation runs carried out by the designer as well.

FIG. 4 shows an exemplary bit structure of a first vertical synchronization marker 401*a* according to an embodiment of the present invention. The first vertical synchronization marker 401*a* is set to a neighborhood of the lower limit of the range of the digital audio signals. The first vertical synchronization marker 401*a*, which is 32 bit long, is constituted by a fixed value area 410*a* and an auxiliary information area 420*a*. In the first vertical synchronization marker 401*a*, the fixed value area 410*a* is constituted by 19 bits, whereas the auxiliary information area 420*a* is constituted by 13 bits. (1000000000000000001)$_2$ is used for the fixed value area 410*a*. In consideration of a possible system extension in the future, the auxiliary information area 420*a* is increased to 13 bits from 8 bits of the comparative example.

FIG. 5 shows an exemplary bit structure of a second vertical synchronization marker 401*b* according to an embodiment of the present invention. The second vertical synchronization marker 401*b* is set to a neighborhood of the upper limit of the range of the digital audio signals. In the second vertical synchronization marker 401*b*, (0111111111111111110)$_2$ is used for the fixed value area 410*b*.

FIG. 6 shows an example of values outputted from the audio transfer LSI used for the transmitter 50 or the receiver 60 according to an embodiment of the present invention. The audio output values outputted from the audio transfer LSI are expressed as follows. That is, as shown in FIG. 6, a positive or negative analog audio signal can be expressed by digital signals represented in two's complement.

In FIG. 6, the range of audio output values outputted from the audio transfer LSI is defined by (7FFFFFFF)$_{16}$ to (80000000)$_{16}$. Note that "0" is expressed by (00000000)$_{16}$, "+1" is expressed by (00000001)$_{16}$, and "−1" is expressed by (FFFFFFFF)$_{16}$.

The vertical synchronization marker 301 of the comparative example is defined by (FFFFFFXX)$_{16}$ which is close to zero of the audio output values. Thus, high is the probability of the occurrence of the pseudo vertical synchronization marker in a process where the value of the digital audio signals after the activation of the mute function converges to zero.

In contrast thereto, the first vertical synchronization marker 401*a* is defined by (8000XXXX)$_{16}$ which is in a neighborhood of the lower limit of the range of the audio output values. It is to be noted also that the a bit sequence containing indefinite bit(s) is denoted by "X". Also, the second vertical synchronization marker 401*b* may be used instead of the first vertical synchronization marker 401*a*. The second vertical synchronization marker 401*b* is defined by (7FFFXXXX)$_{16}$ which is in a neighborhood of the upper limit of the range of the audio output values.

As described above, the vertical synchronization marker is set to a neighborhood of a peak value of audio output values, so that the probability of the occurrence of the pseudo vertical synchronization marker upon activation of the mute function can be reduced.

A description is now given of a function of identifying between the vertical synchronization marker and the compressed-and-coded image data. Suppose that the image data and the vertical synchronization marker each has the same bit sequence when the image data compressed and coded by the compressing/coding unit 20 is delimited by 32 bits. Then the function to identify them is added in the present embodiment. More specifically, an identification bit sequence is appended to the bit sequence constituting the vertical synchronization marker. Here, the identification bit sequence is used to identify whether the bit sequence is the vertical synchronization marker or the compressed-and-coded image data.

Figures 7A, 7B:
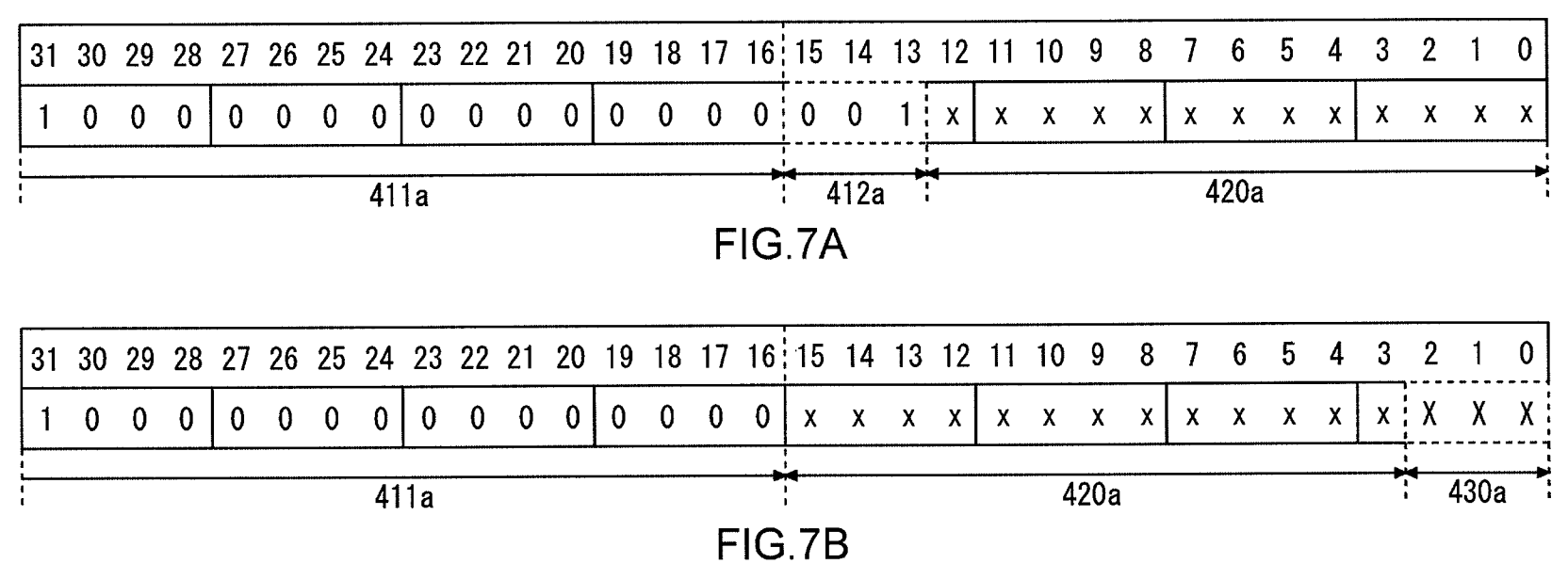

FIGS. 7A and 7B each explains a process by which to allow compressed-and-coded imaged data and a vertical synchronization marker to be identified therebetween. FIG. 7A shows a bit processing on an image data transmitting apparatus 100 side, and FIG. 7B shows a bit processing on an image data receiving apparatus 200 side.

On the image data transmitting apparatus 100 side, the marker insertion unit 23 determines whether the 16-bit image data inputted from the coding unit 22 and a 16-bit vertical synchronization marker 411a ($(8000)_{16}$ in the first vertical synchronization marker) agree with each other or not. Then, the marker insertion unit 23 appends an escape bit 412a indicating the result of the determination to a lower bit side of the vertical synchronization marker 411a. The escape bit 412a is constituted by 3 bits; $(000)_2$ indicates that upper 16 bits adjacent to the escape bit 412a are image data, and $(001)_2$ indicates a vertical synchronization marker.

On the image data receiving apparatus 200, the marker extraction unit 91 receives data in units of 32 bits and detects the value of the escape bit 412a when the upper 16 bits thereof agree with the vertical synchronization marker 411a. If the escape bit 412a is $(001)_2$, the upper 16 bits thereof is determined to be the vertical synchronization marker 411a and is extracted. If the escape bit 412a is $(000)_2$, the upper 16 bits thereof is determined to be the compressed-and-coded image data and is passed to the decoding unit 92. Then the marker extraction unit 91 removes the escape bit 412a and moves over the lower 13 bits of data in units of 32 bits to the left. Then, the upper 3 bits 430a of data of the next 32 bits are inserted into an empty space generated by moving over the lower 13 bits.

As described above, by employing the present embodiment, even if the mute function of the audio transfer LSI is activated when the image data is to be transmitted using the audio transfer LSI, the occurrence of the pseudo vertical synchronization markers can be suppressed and therefore the malfunction at the receiving side can be reduced. For example, erroneous images or images having large noise accumulated can be prevented from being displayed. Also, since the image data is transmitted using the audio transfer LSI, the image data can be transmitted in real time with the minimum delay.

The present invention has been described based on several embodiments. These embodiments are intended to be illustrative only, and it is understood by those skilled in the art that various modifications to constituting elements and processes as well as arbitrary combinations thereof could be developed and that such modifications and combinations are also within the scope of the present invention.

Figure 8:
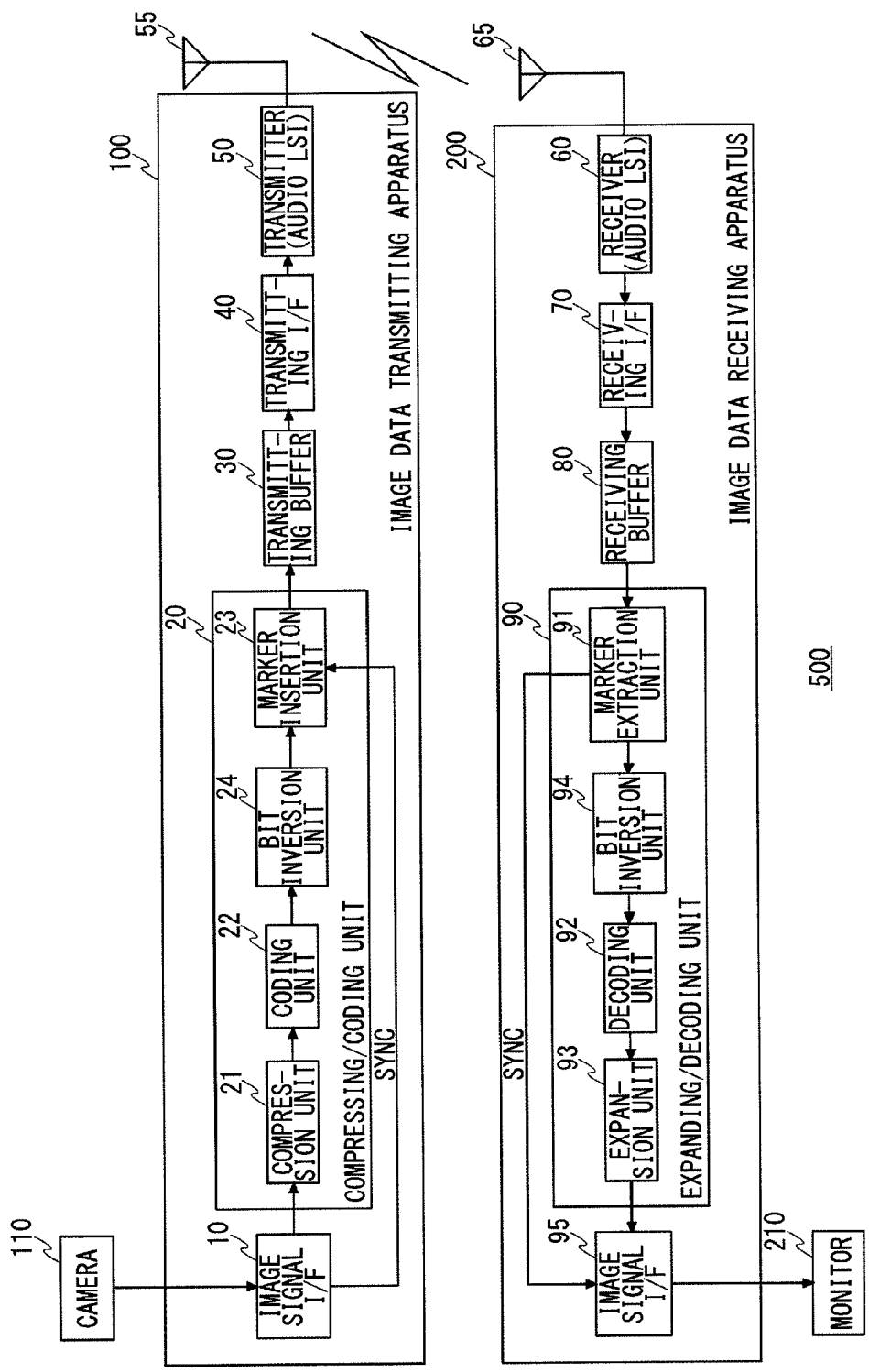
FIG. 8 shows a general structure of an image data transmission system according to a modification.

FIG. 8 shows a general structure of an image data transmission system 500 according to a modification. The image data transmitting system 500 shown in FIG. 8 is configured such that a bit inversion unit 24 and a bit inversion 94 are added to the image data transmitting system 500 shown in FIG. 1. In other words, the bit inversion unit 24 is added between the coding unit 22 and the marker insertion unit 23 in the compressing/coding unit 20, and the bit inversion unit 94 is added between the marker extraction unit 91 and the decoding unit 92 in the expanding/decoding unit 90.

Since the audio transfer LSI is used for the transmitter 50 and the receiver 60, the digital value can be represented in two's complement. Thus, the image data can be transmitted by inverting bit(s). As a result, an effect of adding an extra layer of security can be expected.

What is claimed is:

1. An image data transmitting apparatus comprising:
   an image compression unit configured to compress image data;
   a marker insertion unit configured to insert a synchronization marker for each of the image data compressed by the image compression unit; and
   a transmitter configured to transmit the image data into which the synchronization marker has been inserted, using a transmission method for digital audio signals,
   wherein a bit sequence constituting the synchronization marker is so set as to become a value different from a bit sequence, converging to zero, which is generated by the transmitter or a receiver for receiving the image data transmitted from the transmitter when a mute function is activated in the transmitter or the receiver, the bit sequence constituting the synchronization marker being set within an upper allowable range from an upper limit of a range of digital data compressed by the image compression unit or set within a lower allowable range from a lower limit of the range thereof toward the upper limit of the range thereof.

2. An image data transmitting apparatus according to claim 1, wherein the bit sequence constituting the synchronization marker is set to a bit sequence which is set beforehand within an allowable range from an upper limit of a range of the digital audio signals generated by the transmitter toward a lower limit thereof or set beforehand within an allowable range from the lower limit thereof toward the upper limit thereof.

3. An image data transmitting apparatus according to claim 1, wherein the bit sequence constituting the synchronization marker contains an identification bit with which to identify whether the bit sequence is the synchronization marker or the image data.

4. An image data transmitting apparatus according to claim 2, wherein the bit sequence constituting the synchronization marker contains an identification bit with which to identify whether the bit sequence is synchronization marker or the image data.

5. An image data receiving apparatus comprising:
   a receiver configured to receive compressed image data into which a synchronization marker has been inserted, using a transmission method for digital audio signals;
   a marker extraction unit configured to extract the synchronization marker from the image data received by the receiver; and
   an image expansion unit configured to expand compressed image data from which the synchronization marker has been removed by the maker extraction unit, based on the synchronization marker,
   wherein a bit sequence constituting the synchronization marker is so set as to become a value different from a bit sequence, converging to zero, which is generated by the receiver or a transmitter for transmitting the image data to the receiver when a mute function is activated in the receiver or the transmitter, the bit sequence constituting the synchronization marker being set within an upper allowable range from an upper limit of a range of digital data expanded by the image expansion unit or set within a lower allowable range from a lower limit of the range thereof toward the upper limit of the range thereof.

6. An image data receiving apparatus according to claim 5, wherein the bit sequence constituting the synchronization marker is set to a bit sequence which is set beforehand within an allowable range from an upper limit of a range of the digital audio signals generated by the transmitter toward a lower limit thereof or set beforehand within an allowable range from the lower limit thereof toward the upper limit thereof.

7. An image data transmitting apparatus according to claim 5, wherein the marker extraction unit determines, by referencing an identification bit contained in the synchronization maker, whether the bit sequence constituting the synchronization marker is the synchronization marker or the image data.

8. An image data transmitting apparatus according to claim 6, wherein the marker extraction unit determines, by referencing an identification bit contained in the synchronization maker, whether the bit sequence constituting the synchronization marker is the synchronization marker or the image data.

9. An image data transmitting system comprising:
an image data transmitting apparatus comprising:
  an image compression unit configured to compress image data;
  a marker insertion unit configured to insert a synchronization marker for each of the image data compressed by the image compression unit; and
  a transmitter configured to transmit the image data into which the synchronization marker has been inserted, using a transmission method for digital audio signals,
  wherein a bit sequence constituting the synchronization marker is so set as to become a value different from a bit sequence, converging to zero, which is generated by the transmitter or a receiver for receiving the image data transmitted from the transmitter when a mute function is activated in the transmitter or the receiver; and
an image data receiving apparatus according to claim 5, for receiving the image data transmitted from the image data transmitting apparatus.

10. A method for transmitting image data comprising:
compressing the image data;
inserting a synchronization marker for each of the image data compressed by the compressing; and
transmitting the image data into which the synchronous marker has been inserted, using a transmission method of digital audio signals,
wherein a bit sequence constituting the synchronization marker is so set as to become a value different from a bit sequence, converging to zero, which is generated by a transmitter or a receiver for receiving the image data transmitted from the transmitter when a mute function is activated in the transmitter or the receiver, the bit sequence constituting the synchronization marker being set within an upper allowable range from an upper limit of a range of digital data compressed in the compressing step or set within a lower allowable range from a lower limit of the range thereof toward the upper limit of the range thereof.

11. A method for receiving image data comprising:
receiving compressed image data into which a synchronization marker has been inserted, using a transmission method for digital audio signals;
extracting the synchronization marker from the image data received by the receiving; and
expanding compressed image data from which the synchronization marker has been removed by the extracting, based on the synchronization marker,
wherein a bit sequence constituting the synchronization marker is so set as to become a value different from a bit sequence, converging to zero, which is generated by a receiver or a transmitter for transmitting the image data to the receiver when a mute function is activated in the receiver or the transmitter, the bit sequence constituting the synchronization marker being set within an upper allowable range from an upper limit of a range of digital data expanded in the expanding step or set within a lower allowable range from a lower limit of the range thereof toward the upper limit of the range thereof.

* * * * *